(12) United States Patent
Saruban et al.

(10) Patent No.: US 8,503,160 B2
(45) Date of Patent: Aug. 6, 2013

(54) LAMINATE TYPE CERAMIC ELECTRONIC COMPONENT AND MANUFACTURING METHOD THEREFOR

(75) Inventors: Masahito Saruban, Nagaokakyo (JP); Makoto Ogawa, Nagaokakyo (JP); Akihiro Motoki, Nagaokakyo (JP); Takehisa Sasabayashi, Nagaokakyo (JP); Takayuki Kayatani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 70 days.

(21) Appl. No.: 13/208,416

(22) Filed: Aug. 12, 2011

(65) Prior Publication Data

US 2012/0039015 A1 Feb. 16, 2012

(30) Foreign Application Priority Data

Aug. 13, 2010 (JP) ................. 2010-181203

(51) Int. Cl.
*H01G 4/228* (2006.01)
*H01G 7/00* (2006.01)

(52) U.S. Cl.
USPC ......................................... 361/309; 29/25.42

(58) Field of Classification Search
USPC ................ 361/306.1, 306.3, 309; 29/25.42
See application file for complete search history.

(56) References Cited

U.S. PATENT DOCUMENTS

| | | | |
|---|---|---|---|
| 5,565,235 A * | 10/1996 | Baudrand et al. ............. | 438/612 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

| | | |
|---|---|---|
| JP | 63-169014 A | 7/1988 |
| JP | 11-087167 A | 3/1999 |
| JP | 2001-196266 A | 7/2001 |
| JP | 2002-076189 A | 3/2002 |

* cited by examiner

*Primary Examiner* — Eric Thomas
(74) *Attorney, Agent, or Firm* — Keating & Bennett, LLP

(57) ABSTRACT

In a laminate type ceramic electronic component, when an external electrode is formed directly by plating onto a surface of a component main body, the plating film that is to serve as the external electrode may have a low fixing strength with respect to the component main body. In order to prevent this problem, an external electrode includes a first plating layer composed of a Ni—B plating film and is first formed such that a plating deposition deposited with the exposed ends of respective internal electrodes as starting points is grown on at least an end surface of a component main body. Then, a second plating layer composed of a Ni plating film containing substantially no B is formed on the first plating layer. Preferably, the B content of the Ni—B plating film constituting the first plating layer is about 0.1 wt % to about 6 wt %.

5 Claims, 5 Drawing Sheets

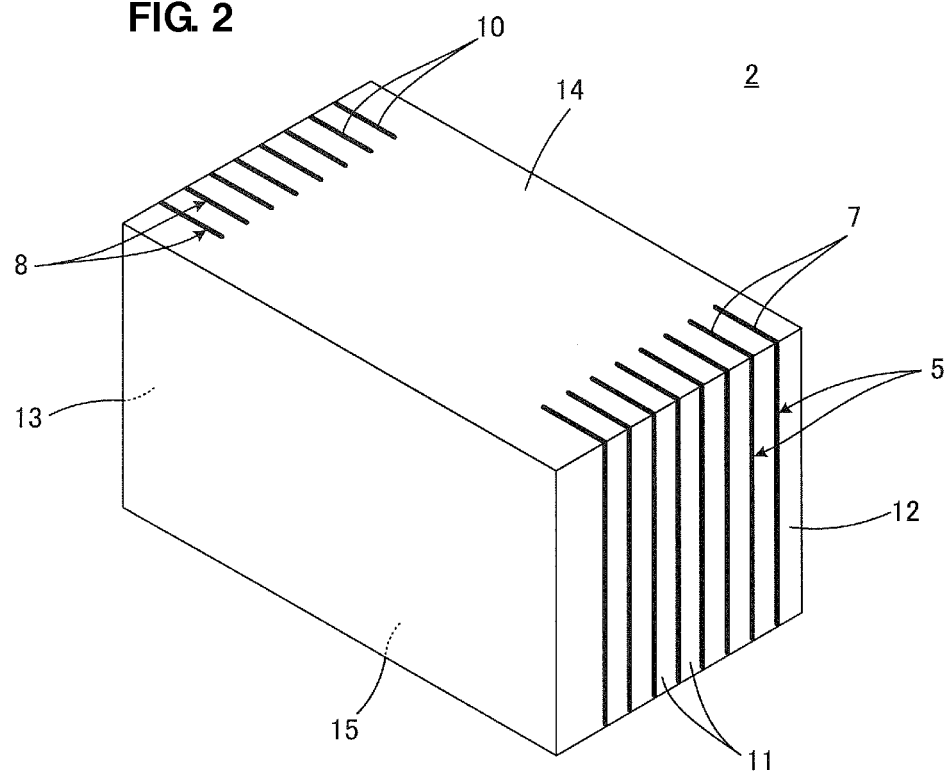

LAMINATE TYPE CERAMIC ELECTRONIC COMPONENT AND MANUFACTURING METHOD THEREFOR

BACKGROUND OF THE INVENTION

1. Field of the Invention

The present invention relates to a laminate type ceramic electronic component and a method for manufacturing thereof, and more particularly, relates to a laminate type ceramic electronic component with an external terminal electrode including a plating film formed directly by plating so as to be electrically connected to a plurality of internal electrodes, and a method for manufacturing the same.

2. Description of the Related Art

As shown in FIG. 5, a laminate type ceramic electronic component 101 typified by a laminated ceramic capacitor generally includes a component main body 105 having a stacked structure, which includes a plurality of stacked ceramic layers 102 composed of, for example, a dielectric ceramic, and a plurality of layered internal electrodes 103 and 104 formed along the interfaces between the ceramic layers 102. The respective ends of the plurality of internal electrodes 103 and the respective ends of the plurality of internal electrodes 104 are exposed respectively at one and the other end surfaces 106 and 107 of the component main body 105. Furthermore, external electrodes 108 and 109 are formed on one and the other end surfaces 106 and 107 of the component main body 105 respectively so as to electrically connect the respective exposed ends of the internal electrodes 103 to each other and the respective exposed ends of the internal electrodes 104 to each other.

For the formation of the external electrodes 108 and 109, in general, a metal paste containing a metal component and a glass component is applied onto the end surfaces 106 and 107 of the component main body 105, and then subjected to firing, thereby forming paste electrode layers 110 first. Next, first plating layers 111 containing, for example, Ni as their main constituent are formed on the paste electrode layers 110, and second plating layers 112 containing, for example, Sn or Au as their main constituent are further formed thereon. More specifically, each of the external electrodes 108 and 109 is composed of a three-layer structure of the paste electrode layer 110, the first plating layer 111, and the second plating layer 112.

The external electrodes 108 and 109 are required to have favorable solderability when the laminate type ceramic electronic component 101 is mounted onto a substrate with the use of solder. At the same time, the external electrode 108 is required to have the function of electrically connecting the plurality of internal electrodes 103 to each other, which are electrically insulated from each other, and the external electrode 109 is required to have the function of electrically connecting the plurality of internal electrodes 104 to each other, which are electrically insulated from each other. The second plating layers 112 described above serve to ensure the solderability, whereas the paste electrode layers 110 serve to electrically connect the internal electrodes 103 to each other and the internal electrodes 104 to each other. The first plating layers 111 serve to prevent solder erosion in solder joint.

However, the paste electrode layer 110 is large in thickness, from several tens μm to several hundreds μm. Therefore, in order to limit the dimensions of the laminate type ceramic electronic component 101 up to certain specifications, there is undesirably a need to reduce the effective volume for ensuring a capacitance because there is a need to ensure the paste electrode layers 110 in terms of volume. On the other hand, the plating layers 111 and 112 have a thickness on the order of several μm. Thus, if the external electrodes 108 and 109 can be composed of only the first plating layers 111 and second plating layers 112, the effective volume can be ensured more for ensuring the capacitance.

For example, Japanese Patent Application Laid-Open No. 63-169014 discloses a method for forming an external electrode, in which a conductive metal layer is deposited by electroless Ni plating on the entire sidewall surface of a component main body, at which internal electrodes are exposed, so as to short circuit the internal electrodes exposed at the sidewall surface.

However, the plating film formed directly by plating onto a surface of the component main body has a problem with the fixing strength between the plating film and the component main body, because glass, as in the case of the paste electrode layer described above, is not interposed between the plating film and the component main body. In this case, as for the fixing strength, importance is placed on not only the fixing strength between the ceramic section in the component main body and the plating film but also the fixing strength between exposed ends of the internal electrodes and the plating film.

On the other hand, importance is also placed on the film strength (to be unlikely to be cracked) of the plating film. Moreover, it is relatively difficult to achieve a balance between the fixing strength and film strength of the plating film described above.

More specifically, when the laminate type ceramic electronic component is mounted with soldering, a stress is applied to the external electrode. In this case, when the plating film is soft, the plating film is unlikely to be cracked, while the stress causes the plating film to peel off to easily cause a gap between the plating film and the component main body. Therefore, the ingress of moisture will be caused into the gap to degrade the insulation resistance, and thus possibly decrease the reliability of the laminate type ceramic electronic component. On the other hand, when the plating film is made harder, the fixing strength is improved, while the plating film is made fragile so as to crack the plating film, and thus decrease the reliability of the laminate type ceramic electronic component.

SUMMARY OF THE INVENTION

Preferred embodiments of the present invention provide a laminate type ceramic electronic component and a method for manufacturing the same, which solve the problems described above.

According to a preferred embodiment of the present invention, a laminate type ceramic electronic component includes a component main body including a plurality of stacked ceramic layers and a plurality of internal electrodes arranged along interfaces between the ceramic layers, each of the internal electrodes including an exposed end exposed at a surface of the component main body; and an external electrode arranged on the surface of the component main body so as to be electrically connected to the exposed ends of each of the internal electrodes, wherein the external electrode includes a first plating layer composed of a Ni—B plating film, which is formed directly on the surface of the component main body, and a second plating layer composed of a Ni plating film containing substantially no B, which is formed on the first plating layer.

In the laminate type ceramic electronic component according to a preferred embodiment of the present invention, the B content of the Ni—B plating film constituting the first plating layer is preferably about 0.1 wt % to about 6 wt %, for example.

According to another preferred embodiment of the present invention, a method for manufacturing a laminate type ceramic electronic component includes the steps of preparing a component main body including a plurality of stacked ceramic layers and a plurality of internal electrodes formed along the interfaces between the ceramic layers, each of the internal electrode including an exposed end exposed at a surface; and forming an external electrode on the surface of the component main body so as to be electrically connected to the exposed ends of each of the internal electrodes, wherein the step of forming a external electrode includes the steps of depositing a plating deposition with the use of the exposed ends for each of the internal electrodes as starting points, and growing the plating deposition on the surface to form a first plating layer composed of a Ni—B plating film; and forming, on the first plating layer, a second plating layer composed of a Ni plating film containing substantially no B.

In the method for manufacturing a laminate type ceramic electronic component according to a preferred embodiment of the present invention, preferably, the Ni—B plating film to serve as the first plating layer is formed by electroless plating, whereas the Ni plating film to serve as the second plating layer is formed by electrolytic plating.

In addition, the step of applying a heat treatment to the component main body with the first plating layer formed is preferably carried out between the step of forming the first plating layer and the step of forming the second plating layer.

In the laminate type ceramic electronic component according to a preferred embodiment of the present invention, first, the first plating layer in the external electrode is composed of the Ni—B plating film, and the fixing strength can be thus improved.

More specifically, the Ni—B plating film is harder than the Ni plating film containing no B. Therefore, the hardness of the first plating layer can be increased. This increased hardness of the first plating layer produces the strong anchor effect between the first plating layer and the ceramic in the case of following minute concavity and convexity of the ceramic. Therefore, the joint strength of the first plating layer with the exposed ends of the internal electrodes is totally increased, and peeling is made less likely to be caused at the interface between the first plating layer and the ceramic section of the peripheral portion in the exposed ends of the internal electrodes. Thus, the reliability in moisture resistance is improved in the case of mounting.

In addition, the Ni—B plating film is, because of its high oxidation resistance, unlikely to be oxidized even when a heat treatment is carried out.

Therefore, the adhesion can be kept high between the Ni—B plating film and the Ni plating film constituting the second plating layer formed on the first plating layer composed of the Ni—B plating film, and the fixing strength or sealing properties can be improved at the interface between the ceramic section and the Ni—B plating film. Accordingly, also in this regard, the reliability in moisture resistance can be improved.

On the other hand, the Ni—B plating film constituting the first plating layer has the drawback that it is fragile and easy to crack, because of its high hardness as described above. More specifically, the first plating layer may be cracked due to a stress or a thermal shock applied during mounting and after mounting to decrease the reliability in moisture resistance.

It is the second plating layer composed of the Ni plating film containing substantially no B that compensates for this drawback. The Ni plating film containing no B is relatively flexible. Therefore, when the first plating layer is protected with the second plating layer, the first plating layer is made less likely to break up, and the reliability in moisture resistance can be thus kept favorable by the first plating layer.

In the manner described above, the external electrode can achieve a balance between the fixing strength of the plating film and the film strength (to be unlikely to be cracked) of the plating film.

In the laminate type ceramic electronic component according to a preferred embodiment of the present invention, when the B content of the Ni—B plating film constituting the first plating layer is selected to be about 0.1 wt % to about 6 wt %, the first plating layer can be made more excellent in terms of fixing strength.

In the method for manufacturing a laminate type ceramic electronic component according to a preferred embodiment of the present invention, when the Ni—B plating film to serve as the first plating layer is formed by electroless plating, a plating film with a desired B content can be formed stably. In addition, when the Ni plating film to serve as the second plating layer is formed by electrolytic plating, the second plating layer can be formed efficiently.

In addition, in the method for manufacturing a laminate type ceramic electronic component according to a preferred embodiment of the present invention, when the step of applying a heat treatment to the component main body including the first plating layer is carried out between the step of forming the first plating layer and the step of forming the second plating layer, interdiffusion is caused between the internal electrodes and the first plating layer, and the volume expansion of metal caused in this interdiffusion section can thus advantageously fill gaps which may be present at the interfaces between the ceramic layers and each of the internal electrodes and first plating layer, thereby advantageously preventing the ingress of moisture into the component main body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a perspective view illustrating a component main body for a laminated ceramic capacitor, which is configured with the use of the ceramic green sheets shown in FIGS. 1A and 1B.

DETAILED DESCRIPTION OF THE PREFERRED EMBODIMENTS

The structure of a laminated ceramic capacitor as a laminate type ceramic electronic component according to preferred embodiments of the present invention will be described in accordance with a manufacturing method therefor, with reference to FIG. 1A through FIG. 4.

Figure 3:
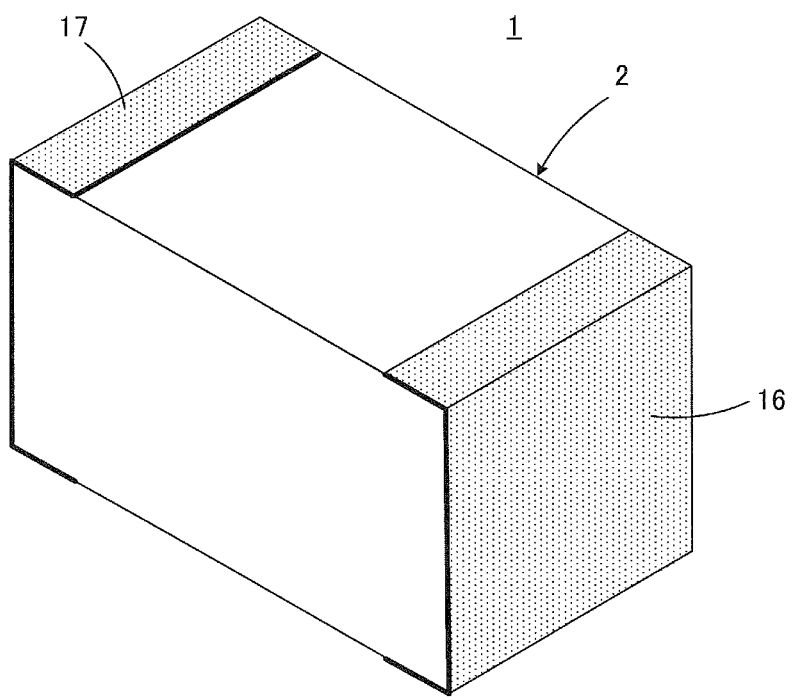
FIG. 3 is a perspective view illustrating a laminated ceramic capacitor with external electrodes formed by plating the component main body shown in FIG. 2.

In order to manufacture a laminated ceramic capacitor 1 shown in FIG. 3, a component main body 2 shown in FIG. 2 is prepared. Furthermore, in order to obtain the component main body 2 shown in FIG. 2, two types of ceramic green sheets 3 and 4 shown in FIGS. 1A and 1B are prepared, respectively.

Figure 1A:
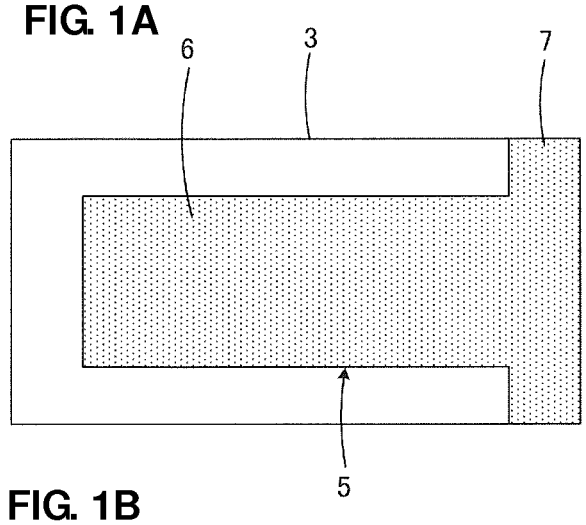
FIGS. 1A and 1B are plan views illustrating two types of ceramic green sheets with an internal electrode printed thereon, which are prepared for manufacturing a laminated ceramic capacitor as a laminate type ceramic electronic component according to a preferred embodiment of the present invention.

A first internal electrode 5 is located on the ceramic green sheet 3 shown in FIG. 1A. The first internal electrode 5 includes a capacitance forming section 6 defining a main portion and an extraction section 7.

The extraction section 7 extends so as to reach one short side of the ceramic green sheet 3 and to reach portions for each of two long sides adjacent to the short side, thereby constituting an exposed end.

Figure 1B:
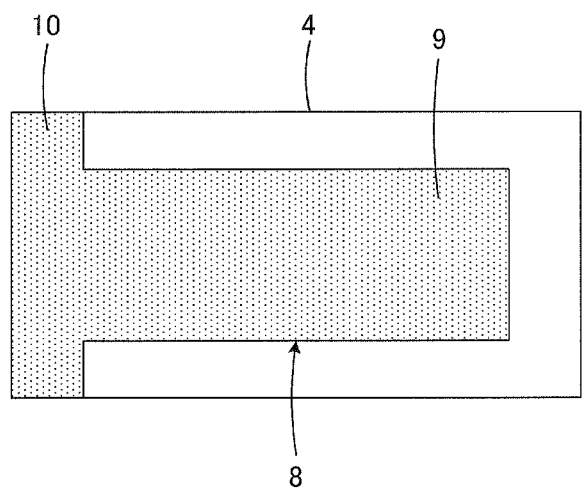

On the other hand, a second internal electrode 8 is located on the ceramic green sheet 4 shown in FIG. 1B. The second internal electrode 8 includes a capacitance forming section 9 defining a main portion and an extraction section 10. The extraction section 10 is located on the side opposite to the extraction section 7 of the first internal electrode 5 described above. The extraction section 10 extends so as to reach one short side of the ceramic green sheet 4 and to reach portions for each of two long sides adjacent to the short side, thereby constituting an exposed end.

The internal electrodes 5 and 8 described above preferably are formed respectively on the ceramic green sheets 3 and 4 by printing a conductive paste containing, for example, Ni as its main constituent.

Next, the respective multiple ceramic green sheets 3 and 4 are stacked alternately, and an appropriate number of ceramic green sheets having no internal electrodes are stacked on the both ends in the direction of stacking the ceramic green sheets 3 and 4 so as to define outer layer sections. This stacking provides the component main body 2 in the raw.

It is to be noted that the stacking step described above may be carried out on mother ceramic green sheets from which a plurality of laminated ceramic capacitors can be extracted, and after the stacking step, a cutting step may be carried out to provide component main bodies 2 in the raw for individual laminated ceramic capacitors.

Next, a firing step is carried out. This firing step provides the sintered component main body 2 as shown in FIG. 2. The component main body 2 includes a plurality of stacked ceramic layers 11. The ceramic layers 11 are obtained by sintering of the ceramic green sheets described above. In addition, the first and second internal electrodes 5 and 8 described previously are sintered, which are located along the interfaces between the ceramic layers 11. The extraction section 7 of the first internal electrode 5 forms an exposed end at one end surface 12 of the component main body 2, as well as partially at each of an upper surface 14 and lower surface 15 adjacent to the end surface 12. The extraction section 10 of the second internal electrode 8 defines an exposed end at the other end surface 13 of the component main body 2, as well as partially at each of the upper surface 14 and lower surface 15 adjacent to the end surface 13.

Next, preferably, the component main body 2 is subjected to a barrel finishing step, thereby ensuring that the exposed ends of the internal electrodes 5 and 8 are exposed. Then, preferably, a washing step with pure water is carried out.

Then, in order to obtain the laminated ceramic capacitor 1 shown in FIG. 3, a first external electrode 16 electrically connected to the exposed ends of the first internal electrodes 5 is located on the one end surface 12 of the component main body 2 as well as partially on each of the upper surface 14 and lower surface 15 adjacent to the end surface 12, and a second external electrode 17 electrically connected to the exposed ends of the second internal electrodes 8 is located on the other end surface 13 of the component main body 2 as well as partially on each of the upper surface 14 and lower surface 15 adjacent to the end surface 13.

The first external electrode 16 and second external electrode 17 described above preferably are formed at the same time, and has the same cross-sectional structure, and thus, the first external electrode 16 shown in FIG. 4 will be described in detail, whereas a detailed description of the second external electrode 17 will be omitted.

Figure 4:
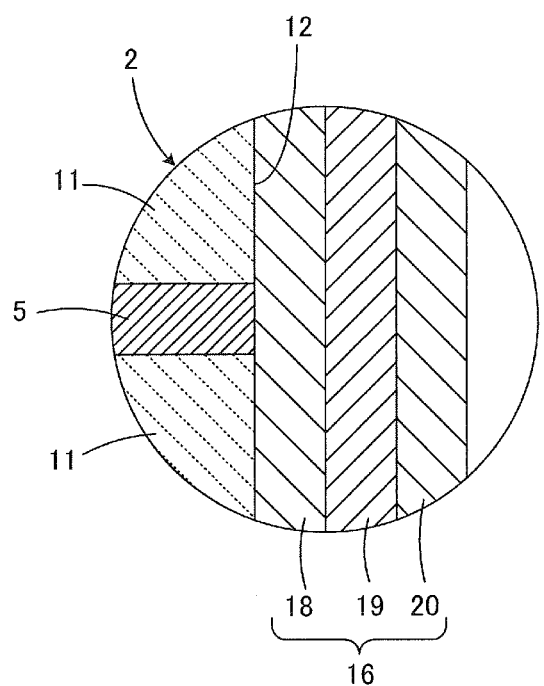
FIG. 4 is a diagram illustrating an enlarged cross section of the external electrode formed for the laminated ceramic capacitor shown in FIG. 3.
Figure 5:
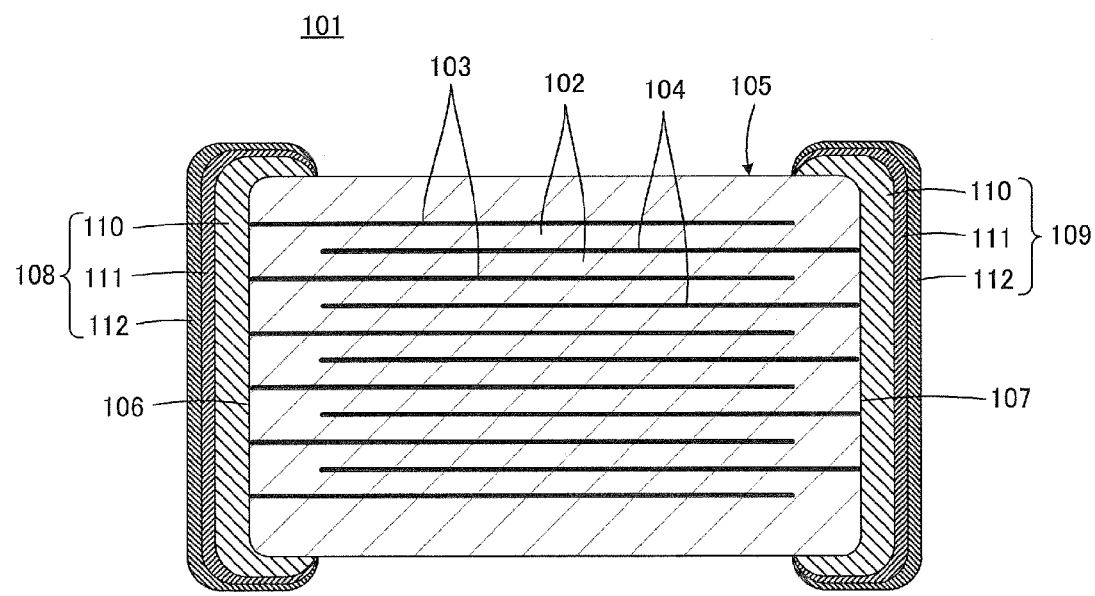
FIG. 5 is a cross-sectional view illustrating a conventional laminate type ceramic electronic component.

Referring to FIG. 4, the first external electrode 16 is made in such a way that a plating deposition deposited with the exposed ends of the respective internal electrodes 5 as starting points is grown on the one end surface 12 of the component main body 2 as well as partially on each of the upper surface 14 and lower surface 15 adjacent to the end surface 12 (see FIG. 2), and includes at least a first plating layer 18 including a Ni—B plating film, and a second plating layer 19 including a Ni plating film containing substantially no B, which is located on the first plating layer 18, and preferably, further includes a third plating layer 20 located on the second plating layer 19. The third plating layer 20 is intended to improve the solderability of the external electrode 16, and includes, for example, an Sn plating film.

The first plating layer 18 described above is preferably formed by electroless plating. Therefore, the step of providing a Pd catalyst and the step of washing with pure water are preferably carried out as pretreatments prior to the electroless plating step, and then, electroless Ni—B plating is carried out to form the first plating layer 18 composed of a Ni—B plating film. In this case, the Ni—B plating film constituting the first plating layer 18 defines a homogeneous and dense film while physically connecting the plating depositions on the respective exposed ends of the adjacent internal electrodes 5 to each other.

It is to be noted that while the Ni at the exposed ends of the internal electrodes 5 is substituted with Pd to improve the catalytic ability for a reducing agent in the electroless Ni—B plating in the step of providing a Pd catalyst, the Ni itself has catalytic performance, and it is thus possible to omit the step of providing a Pd catalyst.

The B content of the Ni—B plating film constituting the first plating layer 18 is preferably about 0.1 wt % to about 6 wt %, for example. When the B content is selected to be about 0.1 wt % to about 6 wt %, the fixing strength of the first plating layer 18 can be further improved. As described above, when the first plating layer 18 is formed by electroless plating, a plating film with a desirable B content can be formed stably. However, if this advantage is not particularly desired, the first plating layer 18 may be formed by electrolytic plating.

After the electroless Ni—B plating step described above, a washing step with pure water is carried out, and preferably, a heat treatment step is carried out. As the heat treatment temperature, for example, a temperature of, for example, about 400° C. or more is preferably adopted. This heat treatment causes interdiffusion between the internal electrodes 5 and the first plating layer 18. Then, the volume expansion of metal caused in this interdiffusion section can thus advantageously fill gaps which may be present at the interfaces between the ceramic layers 11 and each of the internal electrodes 5 and first plating layer 18, thereby producing the effect of preventing the ingress of moisture into the component main body 2.

Next, the second plating layer 19 is formed which is composed of a Ni plating film containing substantially no B.

The second plating layer 19 is preferably formed by electrolytic plating. When the second plating layer 19 is formed by electrolytic plating, the second plating layer 19 can be formed efficiently. However, this advantage is not particularly desired, the second plating layer 19 may be formed by electroless plating.

After the electrolytic Ni plating step described above, a washing step with pure water is carried out.

It is to be noted that other plating layers may be interposed between the first plating layer 18 and the second plating layer 19, rather than forming the second plating layer 19 directly on the first plating layer 18.

Next, the third plating layer 20 is formed which is composed of, for example, an Sn plating film. The third plating layer 20 is preferably formed by electrolytic plating.

After the electrolytic Sn plating step described above, a washing step with pure water is carried out, and a drying step is then carried out.

In this way, the laminated ceramic capacitor 1 shown in FIG. 3 is completed.

The laminated ceramic capacitor 1 described above preferably includes the ceramic layers 11 composed of a dielectric ceramic. However, the laminate type ceramic electronic component to which the present invention is directed is not limited to the laminated ceramic capacitor, and may be intended to constitute an inductor, a thermistor, a piezoelectric component, etc. Therefore, the ceramic layers may be composed of, in addition to the dielectric ceramic, a magnetic ceramic, a semiconductor ceramic, a piezoelectric ceramic, etc., depending on the function of the laminate type ceramic electronic component.

In addition, while the laminated ceramic capacitor 1 shown is a two-terminal capacitor including the two external electrodes 16 and 17, the present invention can also be applied to multi-terminal laminate type ceramic electronic components with three or more terminals.

An experimental example will be described below which was carried out for confirming the advantageous effects of various preferred embodiments of the present invention. In this experimental example, prepared were respective laminated ceramic capacitors according to samples 1 and 2 as examples within the scope of the present invention, as well as respective laminated ceramic capacitors according to samples 3 to 5 as comparative examples outside the scope of the present invention.

Sample 1

A component main body for a laminated ceramic capacitor with planar dimensions of 1.0 mm×0.5 mm was prepared which had ceramic layers composed of a barium titanate based dielectric ceramic and internal electrodes containing Ni as their main constituent. In this component main body, the ceramic layers between the internal electrodes each had a thickness of 1 μm, the internal electrodes each had a thickness of 1 μm, and the outer layer sections with no internal electrode placed each had a thickness of 50 μm. In addition, as pretreatments for a plating treatment described below, the component main body was subjected to barrel finishing to ensure that the internal electrodes had the exposed ends exposed, and a washing step with pure water was then carried out.

Next, the component main body was subjected to the step of providing a Pd catalyst. In the step of providing a Pd catalyst, an aqueous palladium chloride solution was prepared at a Pd concentration of 100 ppm, a pH of 2.5, and a temperature of 25° C., and the component main body was immersed in the aqueous palladium chloride solution for 3 minutes. After the immersion, the component main body was pulled out from the aqueous palladium chloride solution, and subjected to washing with pure water.

Next, a rotation barrel with a drum of 300 cc and a diameter of 70 mm was prepared, and 20 ml of the component main body was put into the rotation barrel. Then, the rotation barrel was immersed in an electroless Ni—B plating bath, where an electroless plating treatment was carried out at a barrel rotation rate of 20 rpm for 20 minutes. In this case, as the electroless Ni—B plating bath, a plating bath set at a B content of 1 wt % was used which had composition including 0.2 mol/L of nickel sulfate, 0.5 mol/L of boric acid, 0.6 mol/L of ammonium chloride, 0.4 mol/L of Rochelle salt, and 0.06 mol/L of dimethylamine borane. In addition, this electroless Ni—B plating bath was adjusted to a pH of 7, and set at a bath temperature of 70° C.

In this way, a first plating layer composed of a Ni—B plating film with a B content of 1 wt % was formed with a film thickness of 1.5 μm.

After the electroless Ni—B plating treatment described above, washing with pure water was carried out.

Next, a heat treatment was carried out at a temperature of 400° C. in the air.

Next, with the use of the same rotation barrel, 40 ml of media made of Sn—Ag—Cu with a diameter of 0.45 mm and 50 cc of stirring balls composed of nylon-covered iron balls with a diameter of 8.0 mm were put in addition to 20 ml of the component main body into the rotation barrel, where electrolytic Ni plating was carried out at a barrel rotation rate of 20 rpm to form, on the first plating layer, a second plating layer composed of an electrolytic Ni plating film containing substantially no B with a film thickness of 2 μm. In this case, as the electrolytic Ni plating bath, a Watt bath (nickel sulfate: 300 g/L, nickel chloride: 45 g/L, boric acid: 40 mg/L) was used which was set at a pH of 4.0 and a bath temperature of 55° C.

After the electrolytic Ni plating treatment described above, washing with pure water was carried out.

Next, as described above, the same rotation barrel with 20 ml of the component main body, 40 ml of media, and 50 cc of stirring balls put therein was used to carry out electrolytic Sn plating at a barrel rotation rate of 20 rpm, and thereby form, on the second plating layer, a third plating layer composed of an electrolytic Sn plating film with a film thickness of 3 μm. In this case, a neutral Sn plating bath ("NB-RZ" manufactured by ISHIHARA SANGYO KAISHA, LTD.) was used as the electrolytic Sn plating bath.

After the electrolytic Sn plating treatment described above, washing with pure water was carried out, and drying was then carried out in air at a temperature of 80° C. for 15 minutes.

In the way described above, a laminated ceramic capacitor according to sample 1 was prepared.

Sample 2

A laminated ceramic capacitor according to sample 2 was prepared through the same steps as in the case of sample 1, except that the heat treatment was omitted after the electroless Ni—B plating treatment for the preparation of the laminated ceramic capacitor according to sample 1.

Sample 3

A laminated ceramic capacitor according to sample 3 was prepared through the same steps as in the case of sample 1, except that the heat treatment and the subsequent electrolytic Ni plating treatment were not carried out after the electroless Ni—B plating treatment for the preparation of the laminated ceramic capacitor according to sample 1.

Sample 4

A laminated ceramic capacitor according to sample 4 was prepared through the same steps as in the case of sample 1, except that the electroless Ni—B plating treatment for the preparation of the laminated ceramic capacitor according to sample 1 was changed to the electroless Ni—P plating treatment.

It is to be noted that, as the electroless Ni—P plating bath for the electroless Ni—P plating treatment, a plating bath set at a P content of 5.5 wt % was used which had composition including 0.1 mol/L of nickel sulfate, 0.2 mol/L of sodium hypophosphite, 0.5 mol/L of citric acid, and 0.5 mol/L of ammonium sulfate. In addition, this electroless Ni—P plating bath was adjusted to a pH of 10 with the use of sulfuric acid and sodium hydroxide as pH adjusters, and set at a bath temperature of 90° C.

Sample 5

A laminated ceramic capacitor according to sample 5 was prepared through the same steps as in the case of sample 1, except that the electroless Ni—B plating treatment for the preparation of the laminated ceramic capacitor according to sample 1 was changed to the electroless Ni—P plating treatment and that the heat treatment was omitted after the electroless Ni—P plating treatment.

It is to be noted that the same plating bath as used in the case of sample 4 was used as the electroless Ni—P plating bath for the electroless Ni—P plating treatment.

The respective laminated ceramic capacitors thus obtained according to samples 1 to 5 were evaluated for sealing properties and electrode fixing strength.

For the evaluation of sealing properties, the laminated ceramic capacitors according to each sample were mounted onto a substrate with soldering, and then subjected to a moisture resistance loading test for 100 hours and for 200 hours under the conditions of temperature: 125° C., humidity: 95% RH, and applied voltage: 6.3 V, the sample with an insulation resistance IR decreased to less than $1\times10^7\Omega$ was regarded as a defective, and the number of defectives was obtained among 72 samples.

For the evaluation of electrode fixing strength, the laminated ceramic capacitors according to each sample were mounted onto a substrate with soldering, and then subjected to a lateral pressing test in which the laminated ceramic capacitors were pressed laterally in a direction parallel to the substrate, the maximum stress value was measured at which peeling of the external electrode was caused, and the average value for the maximum stress value was obtained among 20 samples.

Table 1 below shows the results of the evaluations for sealing properties and electrode fixing strength, as well as the fracture mode in the evaluation of the electrode fixing strength.

TABLE 1

| Sample Number | The Number of Defectives in Sealing Properties | | Electrode Fixing Strength | Fracture Mode |
|---|---|---|---|---|
| | 100 hours | 200 hours | | |
| 1 | 0 | 0 | 12N | Solder Cohesive Failure |
| 2 | 0 | 3 | 12N | Solder Cohesive Failure |
| 3 | 6 | 10 | 12N | Solder Cohesive Failure |
| 4 | 0 | 0 | 5N | First Plating Layer/Second Plating Layer Peeling |
| 5 | 5 | 8 | 8N | Component Main Body/First Plating Layer Peeling |

As can be seen from Table 1, samples 1 and 2 with the electroless Ni—B plating film as the first plating layer and the electrolytic Ni plating film as the second plating layer produced excellent results, with 0 for the number of defectives in sealing properties in the moisture resistance loading test for 100 hours and with a high electrode fixing strength of 12 N.

When a comparison is made between sample 1 and sample 2, there is a difference caused in the number of defectives in sealing properties in the moisture resistance loading test for 200 hours. More specifically, sample 1 resulted in 0, whereas sample 2 resulted in 3 for the number of defectives in sealing properties in the moisture resistance loading test for 200 hours.

This is presumed to be because the heat treatment was carried out after the electroless Ni—B plating treatment in the case of sample 1, whereas this heat treatment was not carried out in the case of sample 2. From this result, it is determined that the heat treatment is effective for the improvement of the sealing properties.

Furthermore, sample 3 for which neither the heat treatment described above nor the electrolytic Ni plating treatment was carried out provided a high fixing strength of 12 N, but produced, for the number of defectives in sealing properties, the results of 6 in the moisture resistance loading test for 100 hours and 10 in the moisture resistance loading test for 200 hours. From this result, it is determined that the presence of the second plating layer composed of the electrolytic Ni plating film is effective for preventing the electroless Ni—B plating film constituting the first plating layer from being cracked and preventing the decease of the reliability in moisture resistance.

On the other hand, sample 4 with the electroless Ni—P plating film formed as the first plating layer in place of the electroless Ni—B plating film produced, for the number of defectives in sealing properties, the result of 0 in both the moisture resistance loading test for 100 hours and the moisture resistance loading test for 200 hours, but provided the lowest electrode fixing strength of 5 N among samples 1 to 5. This is presumed to be because the heat treatment after the formation of the electroless Ni—P plating film oxidizes the surface of the electroless Ni—P plating film, thereby decreasing the joint strength at the interface between the electroless Ni—P plating film and the electrolytic Ni plating film. This presumption can be confirmed from the fact that peeling was caused at the interface between the first plating layer and the second plating layer in the fracture mode.

Next, sample 5 with the electroless Ni—P plating film formed as the first plating layer in place of the electroless Ni—B plating film while the heat treatment was not carried out after the electroless Ni—P plating treatment produced a better result with an electrode fixing strength of 8N than in the case of sample 4. However, sample 5 caused 5 defectives in terms of sealing properties in the moisture resistance loading test for 100 hours, and 8 defectives in terms of sealing properties in the moisture resistance loading test for 200 hours. This is presumed to be because, when the heat treatment was not carried out after the electroless Ni—P plating treatment, no interdiffusion was caused between the Ni—P plating film and the internal electrodes, thereby resulting in a failure to sufficiently fill gaps which may induce the ingress of moisture. This presumption can be confirmed from the fact that peeling was caused at the interface between the component main body and the first plating layer in the fracture mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminate type ceramic electronic component comprising:
   a component main body including a plurality of stacked ceramic layers and a plurality of internal electrodes arranged along interfaces between the ceramic layers, each of the internal electrodes including an exposed end exposed at a surface; and
   an external electrode located on the surface of the component main body so as to be electrically connected to the exposed ends of each of the internal electrodes; wherein the external electrode comprises:
      a first plating layer composed of a Ni—B plating film, which is disposed directly on the surface; and
      a second plating layer composed of a Ni plating film containing substantially no B, which is disposed on the first plating layer;
   the exposed end of each of the plurality of internal electrodes is defined by an extraction section that extends to one short side of a respective one of the plurality of stacked ceramic layers and to each of two long sides of the respective one of the plurality of stacked ceramic layers that are adjacent to the one short side; and
   the external electrode is disposed on and connected to the extraction section of each of the plurality of internal electrodes at one end surface of the component main body and disposed on and connected to the extraction section of each of the plurality of internal electrodes at a portion of each of an upper surface and a lower surface of the component main body that are adjacent to the one end surface.

2. The laminate type ceramic electronic component according to claim 1, wherein the B content of the Ni—B plating film constituting the first plating layer is about 0.1 wt % to about 6 wt %.

3. A method for manufacturing a laminate type ceramic electronic component comprising the steps of:
   preparing a component main body including a plurality of stacked ceramic layers and a plurality of internal electrodes formed along interfaces between the ceramic layers, each of the internal electrodes including an exposed end exposed at a surface; and
   forming an external electrode on the surface of the component main body so as to be electrically connected to the exposed ends of the internal electrodes; wherein the step of forming the external electrode comprises the steps of:
      depositing a plating deposition with the use of the exposed ends for each of the internal electrodes as starting points, and growing the plating deposition on the surface to form a first plating layer composed of a Ni—B plating film; and
      forming, on the first plating layer, a second plating layer composed of a Ni plating film containing substantially no B;
   the exposed end of each of the plurality of internal electrodes is defined by an extraction section that extends to one short side of a respective one of the plurality of stacked ceramic layers and to each of two long sides of the respective one of the plurality of stacked ceramic layers that are adjacent to the one short side; and
   the external electrode is formed so as to be disposed on and connected to the extraction section of each of the plurality of internal electrodes at one end surface of the component main body and disposed on and connected to the extraction section of each of the plurality of internal electrodes at a portion of each of an upper surface and a lower surface of the component main body that are adjacent to the one end surface.

4. The method for manufacturing a laminate type ceramic electronic component according to claim 3, wherein the Ni—B plating film to serve as the first plating layer is formed by electroless plating, and the Ni plating film to serve as the second plating layer is formed by electrolytic plating.

5. The method for manufacturing a laminate type ceramic electronic component according to claim 3, further comprising the step of applying a heat treatment to the component main body after the first plating layer has been formed, the step carried out between the step of forming the first plating layer and the step of forming the second plating layer.

* * * * *